March 23, 1937.  B. L. DORSEY  2,074,540
BAIT HOLDER
Filed Aug. 23, 1935
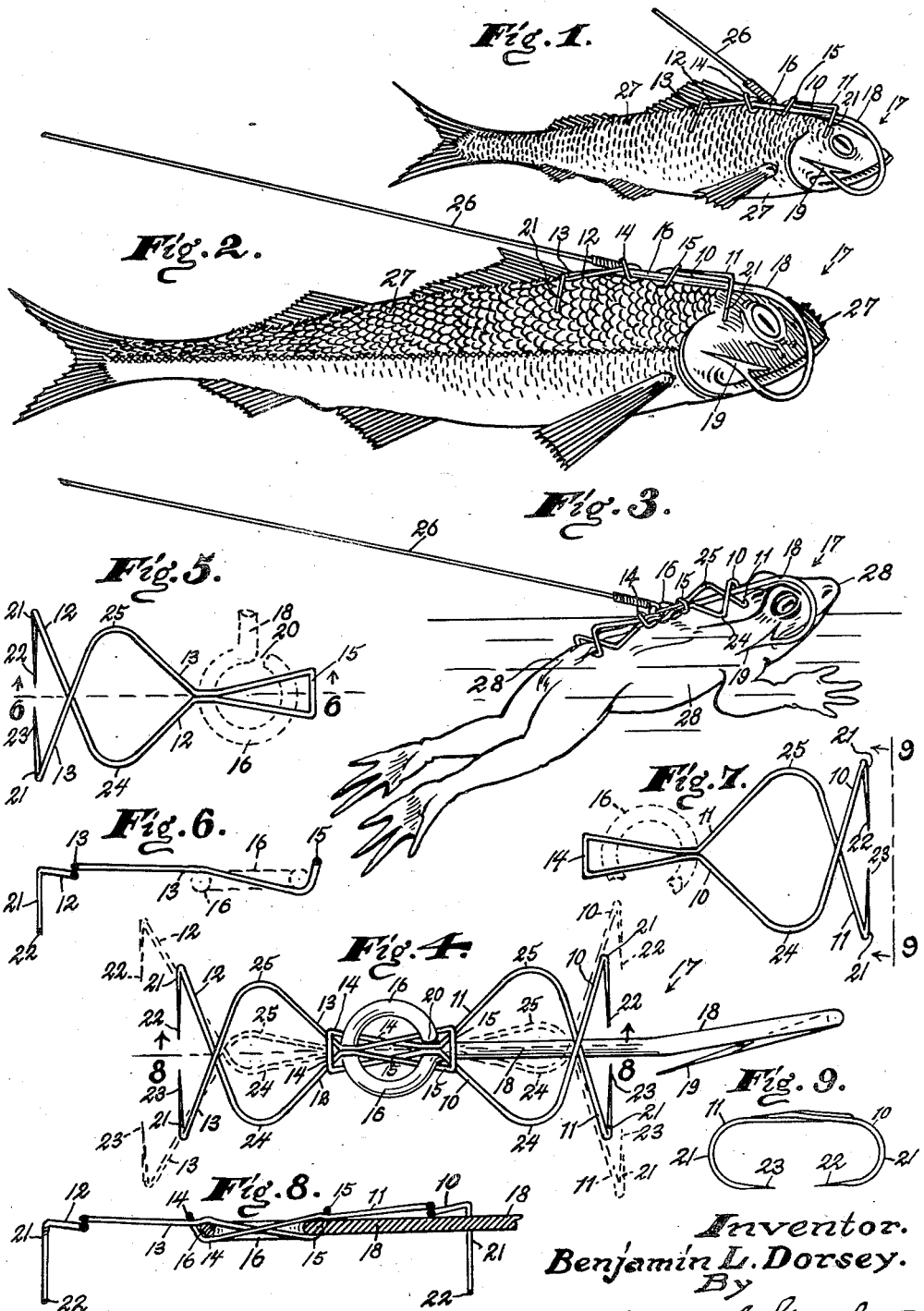
Inventor.
Benjamin L. Dorsey.
By
William M. Gentle
His Attorney.

Patented Mar. 23, 1937

2,074,540

UNITED STATES PATENT OFFICE 2,074,540

BAIT HOLDER

Benjamin L. Dorsey, Los Angeles, Calif.

Application August 23, 1935, Serial No. 37,539

3 Claims. (Cl. 43—40)

This invention relates to an appliance for use in fishing, and is an improvement on the bait holder for fish hook for which I filed application for United States patent on July 29, 1935, Sr. No. 32,559.

The principal object of this invention is to simplify the construction of the crossed clasping arms; and means for detachably connecting them to a hook so they are interlocked thereon, and also so the spring arms can be more easily actuated to separate their barbed points for inserting live bait between them.

Another object of this invention is to provide the bait holder with crossed clasping arms in pairs that are interchangeable to thereby provide the hook with either long or short arms or with both. In other words, when a fisherman is using small live bait he can attach arms to his hook that are of suitable length for holding it; and if changing to larger live bait he can remove the short arms and replace them with longer arms on the same hook.

Another feature of the invention is to form each pair of arms with hairpin hooks that enable the pairs of arms to be extended in opposite directions and which can be detachably interlocked on the eyelet of a fish-hook, so these pairs of arms are very rigidly secured to the hook and removable so they can be replaced with larger, smaller or more suitable pairs of arms.

Another feature of invention is shown in arranging the pairs of arms so they hold the hook in a relatively obscure position on the back of live bait so it cannot be easily seen from a position under a frog or live minnow.

Another feature of invention is shown in forming the pairs of arms of small gauge spring metal that is of a hue or color not clearly visible when placed in water so that in use the bait holder is not clearly visible to the fish to be taken.

Other objects, advantages and features of invention may appear from the accompanying drawing and the detailed description thereof.

The accompanying drawing illustrates the invention, in which:

Figure 1 is a perspective view of a bait holder that is constructed in accordance with my invention, assuming it to be attached to an ordinary sized live minnow.

Fig. 2 is a view analogous to Fig. 1 showing a larger size bait holder and minnow.

Fig. 3 is a view analogous to Fig. 1 showing how a live frog is detachably secured to my bait holder so the shank of a fish hook is carried relatively flat on the frog's back.

Fig. 4 is a plan view of a relatively large sized bait holder and hook showing how the looped ends of the pairs of clasping arms are lockingly and detachably secured to the eyelet of the fish hook.

Fig. 5 is a plan view of the rearwardly extending clasping arms with the looped end arranged with the eyelet in about the position it normally occupies, except that the eyelet shown by dotted lines is turned about ninety degrees from its position shown in Fig. 4 to more clearly show that the eyelet is open when the loops of the arms are placed on or removed from the hook.

Fig. 6 is a section on line 6—6 of Fig. 5 showing how the loop of the arms is hooked under the eyelet in one zone and extended over it in the opposite zone.

Fig. 7 is a plan view of the pair of forwardly extending clasping arms.

Fig. 8 is a section on line 8—8 of Fig. 4.

Fig. 9 is an end view of the pair of arms shown in Fig. 7 as viewed from the line 9—9 thereof.

In detail my bait holder includes two pairs of arms 10, 11 and 12, 13 that are integral with the respective hair-pin loops 14 and 15 that are attached to the eyelet 16 of a fish hook 17 so one pair of arms extends over the shank 18 of the hook toward the barbed point 19 and the other pair in a reverse direction; with the hair-pin loops 14, 15 constructed so they interlock on the eyelet 16 and hold the arms in a relatively fixed position on the hook. However, the loops 14 and 15 are constructed so they are removable from the eyelet and interchangeable with other like pairs of arms that are larger, smaller, longer or shorter, it being obvious that the arms can be of various lengths and sizes suitable for large or small live bait; and although the pairs of arms can vary greatly in size they are all constructed alike, preferably of small gauge fine spring metal that will not easily corrode, and which is of a color or tint that will not be clearly visible when placed in water.

In attaching the pairs of arms to the hook the eyelet 16 is slightly opened at 20, as indicated by dotted lines in Fig. 5, after which the loop 15 can be inserted over the ring portion of the eyelet and then turned around until it is astride the shank 18 and also locked over the arms 10 and 11 adjacent the eyelet 16, which arrangement of parts causes the loop 14 to extend over in locking engagement with the arms 12 and 13 adjacent the eyelet 16; after which the eyelet can be closed as best shown in Fig. 4 so that neither pair of arms can get out of position on the hook until the eyelet is again opened for manually removing and replacing them. The shank 18 extends through the loop 15 so it prevents both pairs of arms from creeping around on the ring of the eyelet.

The outer end portions of the arms are curved downwardly and inwardly toward a common plane that extends centrally and longitudinally through the shank 18, and these curved portions 21 terminate in the sharp barb points 22, 23. Also all of the arms are bent to form the curved bows 24, 25 that are arranged to be manually pressed inwardly toward one another to cause the barb points 22, 23 to move further apart so that live bait can be placed between them; and the tension of the arms will cause them to resume their normal position when the bows 24, 25 are released so the barb points will impale the live bait and sink the points sufficiently deep in the skin thereof to hold the bait on the hook without material injury thereto.

It is obvious that the fishing line 26 can be secured to the eyelet 16, as shown in Figs. 1, 2 and 3 of the drawing; or that any well known connection such as a fine wire or catgut leader can connect the eyelet 16 with a fish line.

In Fig. 1 my bait holder is shown attached to an ordinary sized minnow 27 and, as connected, it can readily be seen that the shank of the hook lies close to the back of the minnow with the barb point of the hook held close to the side of the minnow's head in a position not easily seen from below the minnow 27.

A slightly larger holder and hook is shown in Fig. 2 attached to a larger minnow with the parts carried and concealed as shown in Fig. 1.

Fig. 3 shows my bait holder in use detachably connecting a frog 28 to a hook 17 and, as seen therein the holder is arranged to be relatively flat and close to the frog's back so it is practically invisible to fish below the frog; also the barb points of the arms engage the back skin of the frog so it is not greatly injured. The injury to the frog is so slight that if not taken by a fish it can be removed from the holder and preserved for future use.

My bait holder is used as hereinbefore fully described.

I claim as my invention:

1. A bait holder including a hook having an eyelet, pairs of crossed clasping arms detachably connected to the eyelet of said hook, and barbs integral with the ends of said arms arranged to hold a live bait so a fish hook is carried on its back.

2. A bait holder including a hook having an eyelet, pairs of crossed interlocking clasping arms detachably connected to the eyelet of said hook, and barbs integral with said arms arranged to hold a live frog so a fish hook is carried on its back.

3. A bait holder including a hook having an eyelet at one end thereof and a barb point at the other, means for detachably and interlockingly securing oppositely arranged pairs of crossed clasping arms in the eyelet of said hook, and barbs integral with the ends of said arms arranged to point inwardly toward a plane extending centrally and longitudinally through the shank of said hook for the purpose specified.

BENJAMIN L. DORSEY.